United States Patent [19]

Samurin et al.

[11] 4,191,485

[45] Mar. 4, 1980

[54] APPARATUS FOR SECURING A WHEEL TO A ROTATABLE SHAFT OF A TURBO-MACHINE

[75] Inventors: Norman A. Samurin, Greensburg; William A. Straslicka, Norvelt, both of Pa.

[73] Assignee: Carrier Corporation, Syracuse, N.Y.

[21] Appl. No.: 956,170

[22] Filed: Oct. 30, 1978

[51] Int. Cl.² ............................................. B63H 1/20
[52] U.S. Cl. ................................. 403/15; 416/244 A
[58] Field of Search ................ 403/15, 16, 31, 34, 403/35, 36, 37; 416/244 R, 244 A, 244 B, 204, 204 A; 29/252

[56] References Cited

U.S. PATENT DOCUMENTS

| | | | |
|---|---|---|---|
| 2,571,265 | 10/1951 | Leufven | 403/31 X |
| 3,469,556 | 9/1969 | Campbell et al. | 416/244 B UX |
| 3,549,275 | 12/1970 | Laskey | 416/244 B X |
| 3,698,836 | 10/1972 | Herbage | 416/244 B X |
| 3,916,495 | 11/1975 | Klassen et al. | 416/244 A X |

*Primary Examiner*—Andrew V. Kundrat
*Attorney, Agent, or Firm*—J. Raymond Curtin; Barry E. Deutsch

[57] ABSTRACT

A wheel of a turbo-machine is secured to the shaft of the machine by forming a side of the wheel with an end cap affixed thereto. Compressive force generating means connected to the end cap generate a force for compressing the wheel between the end cap and shaft.

2 Claims, 1 Drawing Figure

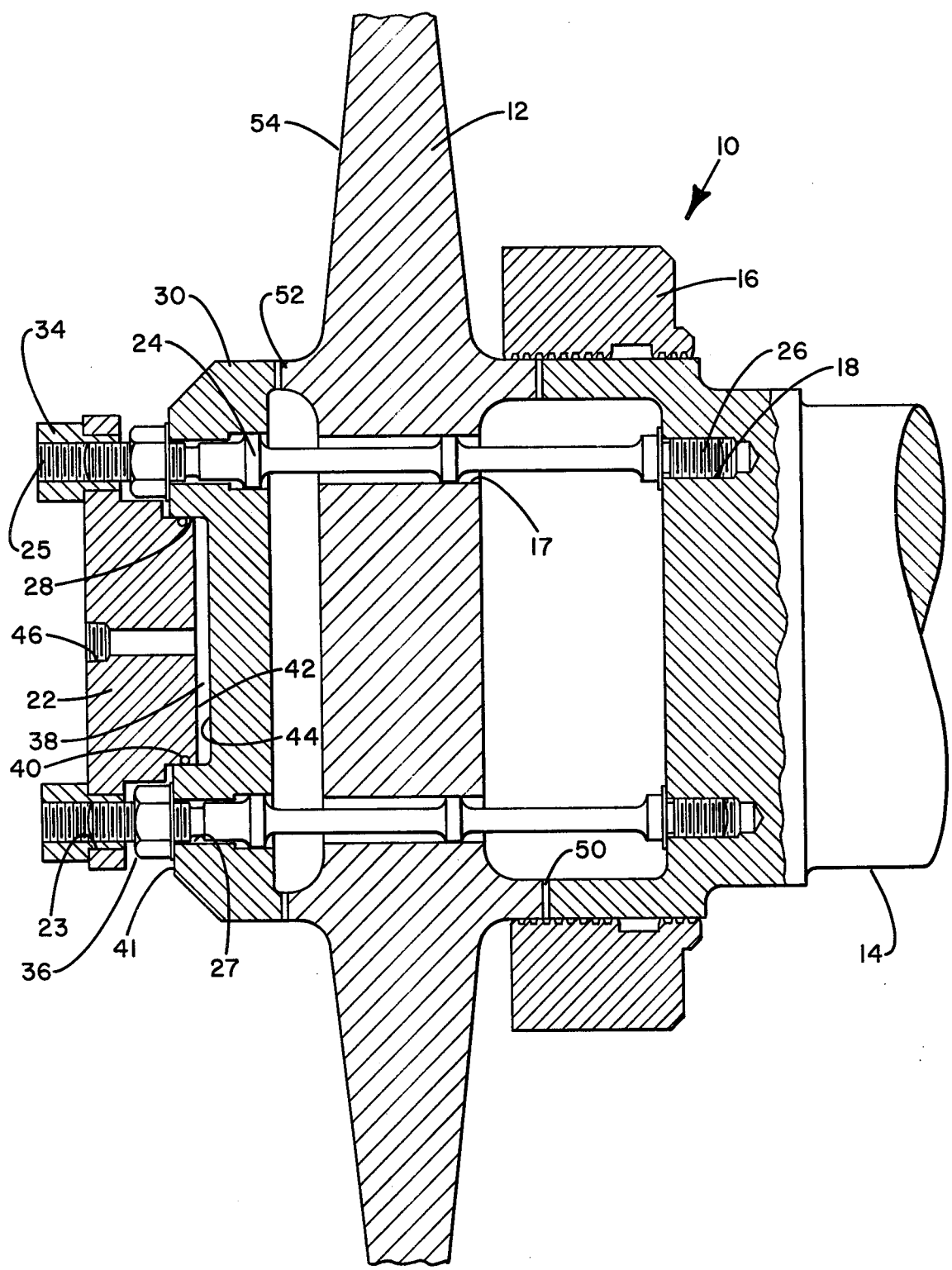

APPARATUS FOR SECURING A WHEEL TO A ROTATABLE SHAFT OF A TURBO-MACHINE

BACKGROUND OF THE INVENTION

This invention relates to apparatus for securing a wheel member of a turbo-machine to a rotatable shaft, and in particular to an arrangement which positively secures the wheel to the shaft without generating torsional forces.

Rotors of turbo-machinery, such as centrifugal compressors, radial turbines, and axial compressors and turbines, are at times manufactured as a composite structure, wherein the disks or wheels of a turbo-machine are attached to stub shafts, which are fixed to the end of a thru-bolt, sometimes referred to as a tie-bolt. In achieving the composite structure, heat has been applied to the thru-bolts for developing forces to positively secure the disks to the shafts. In order to apply the heat, holes have been drilled through the entire length of the shafts, destroying the integrity of the shafts and increasing the problems associated with achieving a dynamic and static balance of the rotor. In addition, alignment of the shaft has been difficult to achieve without complicated and relatively expensive manufacturing techniques. It has been suggested that the heating step used to positively secure the disks to the shaft be eliminated, and that compression and torsional forces developed through the use of appropriate stud and nut arrangements be used to achieve the desired mating of the wheel and shaft.

However, turbo-machinery employed in many applications such as power recovery installations, operate at relatively high temperatures. Thus, the working strength of the various elements of the turbo-machine are reduced as the working strength of a metallic component generally varies inversely to the temperature of the environment in which the component operates. The torsional forces develop in securing the wheel to the shaft will generate torsional stresses. Such stresses may result in the failure of one or more of the studs due to the relatively low value of the working strength of the studs. As in obvious, failure of a connecting stud may result in major damage to the turbo-machine.

SUMMARY OF THE INVENTION

Accordingly, it is an object of this invention to eliminate torsional stresses developed in the means employed to secure a wheel to a shaft of a turbo-machine rotor.

It is a further object of this invention to utilize solely compressive forces to secure the wheel to the shaft.

It is a further object of this invention to positively secure a wheel to a shaft without creating torsional stresses.

It is yet another object of this invention to provide a wheel secured to a shaft suitable for use in high temperature environments.

It is yet another object of this invention to securely and accurately attach the wheel to a shaft through a relatively inexpensive arrangement.

It is a further object of this invention to securely and accurately attach the wheel to a shaft through the use of an expandable member which may be used in association with more than one turbo-machine.

These and other objects of the present invention are attained in an apparatus for securing a wheel to a rotatable shaft of a turbo-machine and including an end cap affixed to one side of the wheel. Coupling means connect the other side of the wheel to one end of a shaft for rotation therewith. Axially extending connecting means join the end cap to the wheel and the wheel to the shaft. Compressive force generating means connected to the end cap generate a compressive force for compressing the wheel betweenn the end cap and shaft for positively securing the wheel to the shaft.

BRIEF DESCRIPTION OF THE DRAWING

The single FIGURE of the drawing illustrates a sectional view of a portion of a turbo-machine embodying the present invention.

DESCRIPTION OF THE EMBODIMENT

Referring now to the drawing, there is disclosed a preferred embodiment of the present invention. In particular, there is disclosed a portion of a turbo-machine 10 comprising a wheel member such as disk 12 attached to rotate with a shaft 14, the disk and shaft forming in combination the rotor section of the turbo-machine. Suitable axially extending seals, for example, labyrinth seals 16 are provided about shaft 14 to maintain leakage of the machine's motivating fluid to a minimum. Shaft 14 is formed with a plurality of tapped holes 18, each of the tapped holes receiving therein a threaded end 26 of a stud 24. Disk 12 includes a plurality of drilled holes or apertures 17 provided in axial alignment with threaded holes 18. Suitable torque transmitting means, such as coupling 50 join disk 12 to shaft 14 resulting in the joint rotation of the shaft and disk.

Turbo-machine 10 may be a centrifugal compressor, radial turbine, or an axial compressor or turbine. Wheel member 12 takes the form of an impeller when machine 10 is a centrifugal compressor or radial turbine, and takes the form of a bladed disk when the machine is an axial compressor or turbine.

The side 54 of wheel 12 remote from shaft 14 includes a rotor end cap 30 attached thereto through suitable coupling means 52. Alternatively, the rotor end cap may be made integral with the wheel thereby eliminating the need for coupling 52. Rotor end cap 30 includes a plurality of holes 27 axially aligned with holes 17 in wheel 12 and holes 18 in shaft 14.

A piston-like member 22 is movably disposed in a chamber 38 defined by axially extending flange 28 of rotor end cap 30. The piston includes a plurality of holes or apertures 23 provided in axial alignment with the holes and apertures respectively provided in end cap 30, wheel 12 and shaft 14. Studs 24 extend axially through the aligned holes in the piston-like member, the rotor end cap, and the wheel and terminate in the threaded holes formed in shaft 14. As noted previously, one end 26 of stud 24 is threaded for mating engagement with the threads formed in hole 18; likewise the other end 25 of stud 24, extending through hole 23 in piston 22, is also threaded. As an alternate construction, stud 24 may be attached to shaft 14 via a thread-nut arrangement in lieu of the thread-tapped hole construction shown.

Piston like member 22 further includes a fluid opening 46. Opening 46 connects with a suitable conduit (not shown) to provide a high pressure fluid from a source thereof (not shown) to chamber 38. A suitable seal, such as O-ring 40, is provided to prevent leakage of the high pressure fluid from chamber 38.

Ends 25 of studs 24 extending through the piston-like member are provided with threads for receiving a first nut 34 and a second nut 36. Nut 36 is interposed between piston like member 22 and rotor end cap 30. Nut 34 secures the end of stud 24 to piston-like member 22. As noted previously, it is desirable to minimize torsional stresses generated in the studs used to secure the wheel to the shaft. The minimization or elimination of torsional stresses is particularly important in turbo-machines utilized with relatively high temperature motivating fluids.

In positively securing wheel 12 to shaft 14, nuts 36 are initially placed in firm contact with side or face 41 of rotor end cap 30. Thence, high pressure hydraulic fluid is delivered to chamber 38 through fluid flow connection 46. The fluid generates a force in the chamber acting against face 42 of member 22 to move the member relative to the wheel to expand the volumetric size of chamber 38. The movement of piston 22 results in the stretching of studs 24 attached thereto. In addition, the hydraulic force acts against face 44 of the rotor end cap thereby generating a compressive force on the end cap which is transmitted to the wheel.

By stretching studs 24, the studs are placed in tension. The tensile force thus developed is transmitted through nuts 36 and the rotor end cap 30 as a compressive force acting against wheel 12 to maintain the wheel positively secured to shaft 14. Once the studs have been stretched to their desired length, nuts 36 are again placed into firm contact with the opposed side of the rotor end cap to maintain the compressive force developed during the stretching of the studs acting against the wheel and shaft. The hydraulic fluid is exhausted from chamber 38 once the desired compression of the components has been achieved. Piston-like member 22 can be withdrawn from chamber 38 by removal of nuts 34 from stud 24 prior to the turbo-machine being placed in operation. Thus, a single piston-like member 22 may be used with more than one turbo-machine to achieve the desired positive locking of the wheel to the shaft.

Since the only forces acting on studs 24 is the tensile force developed during stretching of the studs, the working strength of the studs will not be decreased as a result of the generation of torsional forces and thus stresses acting thereon.

When it is desired to remove the wheel from the shaft, piston-like member 22 is reattached to rotor end cap 30. Hydraulic fluid is reintroduced into chamber 38 to again stretch the studs 24 to eliminate the compressive force acting on the wheel. The arrangement herein disclosed provides a relatively inexpensive means for positively securing the wheel of a turbo-machine to a shaft. The arrangement finds particular applicability in turbo-machines having relatively high temperature working fluid flowing therethrough, where it is particularly important that torsional stresses be maintained at a minimum to prevent material fatigue. While only a single wheel has been shown mounted on shaft 14, it should be understood the present invention may be used to secure more than one wheel to a shaft in machines having multi-wheel designs.

While a preferred embodiment of the invention has been described and illustrated the invention should not be limited thereto but may be otherwise embodied within the scope of the following claims.

What is claimed is:

1. Apparatus for securing a wheel to a rotatable shaft of a turbomachine comprising:
   an end cap forming one end of said wheel and including an axially extending flange defining a chamber;
   coupling means connecting the other end of said wheel to one end of said shaft for rotating the wheel with the shaft;
   a plurality of connecting means extending axially through aligned apertures formed in said wheel and said end cap, with one end of said connecting means being positively secured to said one end of said shaft;
   a movable piston slidably mounted within said chamber and connected to the unsecured ends of said connecting means; and
   force generating means for moving said piston within said chamber relative to said end cap for stretching said connecting means and for simultaneously compressing said wheel between said shaft and said end cap.

2. Apparatus in accordance with claim 1 wherein the axially extending connecting means includes a plurality of studs, with each stud including a nut-like member movable along the threaded surface thereof for engaging a radially extending side of said end cap for transmitting a compressive force to the end cap from said studs for compressing the wheel between the end cap and the shaft.

* * * * *